US006912565B1

(12) United States Patent
Powers et al.

(10) Patent No.: US 6,912,565 B1
(45) Date of Patent: Jun. 28, 2005

(54) DISTRIBUTED VIRTUAL ENVIRONMENT

(75) Inventors: Simon J Powers, Ipswich (GB); Michael R Hinds, Felixstowe (GB); Jason Morphett, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/194,317

(22) PCT Filed: Oct. 19, 1998

(86) PCT No.: PCT/GB98/03121

§ 371 (c)(1),
(2), (4) Date: Nov. 24, 1998

(87) PCT Pub. No.: WO99/21117

PCT Pub. Date: Apr. 29, 1999

(30) Foreign Application Priority Data

Oct. 22, 1997 (GB) .............................. 9722343

(51) Int. Cl.[7] .............................................. G06F 15/16
(52) U.S. Cl. ........................ 709/205; 715/771; 717/104
(58) Field of Search ................................ 709/200–253; 345/1.1–3.4, 100–866; 463/1–47, 626–641; 719/311; 717/101–113

(56) References Cited

U.S. PATENT DOCUMENTS

| 5,659,691 | A  | * | 8/1997 | Durward et al. | 345/757 |
| 6,285,380 | B1 | * | 9/2001 | Perlin et al. | 345/473 |
| 6,377,263 | B1 | * | 4/2002 | Falacara et al. | 345/473 |
| 6,414,684 | B1 | * | 7/2002 | Mochizuki et al. | 345/473 |
| 6,577,328 | B2 | * | 6/2003 | Matsuda et al. | 345/757 |

FOREIGN PATENT DOCUMENTS

| EP | 0696018 A2 | 2/1996 |
| EP | 0753836 A2 | 1/1997 |
| WO | WO 97 23845 A | 7/1997 |
| WO | WO 97/40461 | 10/1997 |

OTHER PUBLICATIONS

Broll Wolfgang "Distributed Virtual Reality for Everyone—a Framework for Networked VR on the Internet" Feb. 1997 IEEE Computer Society Press p. 1–8.*

Singh et al, "Networked Virtual Worlds" Proceedings Computer Animation, Apr. 19, 1995, pp. 44–49, XP000195798.

Wang et al, "EM—An Environment Manager for Building Neworked Virtual Environments" Proceedings of the Virtual Reality Annual International Symposium, Research Triangle Park, Mar. 11–15, 1995, pp. 11–18, XP000574850, Institute of Electrical and Electronics Engineers.

Meyer et al, "Region–Based Tracking Using Affine Motion Models in Long Image Sequences" CVGIP Image Understanding, vol. 60, No. 2, Sep. 1, 1994, pp. 119–140, XP000484198.

Macedonia et al, "NPSNET:A Multi–Player 3D Virtual Environment Over the Internet" Proceedings of the Symposium on Interactive 3D Graphics, Monterey, Apr. 9–12, 1995, pp. 93–94, XP000546195.

(Continued)

Primary Examiner—Meng-Al T. An
Assistant Examiner—Charles Anya
(74) Attorney, Agent, or Firm—Nixon & Vanderhye P.C.

(57) ABSTRACT

A distributed virtual environment includes one or more entities represented in the virtual environment by at least a conceptual entity-model, a dynamic entity-model and a visual entity-model each of the entity models being mutually independent. A server provides a conceptual-model manager, arranged to provide conceptual entity-models, one or more dynamic-model managers arranged to provide dynamic entity-models, and one or more client apparatuses arranged to provide a visual-model manager arranged to provide visual entity-models. Communications is arranged to allow transmission of messages between the conceptual-model manager, one or more dynamic-model managers and one or more visual-model managers.

12 Claims, 7 Drawing Sheets

OTHER PUBLICATIONS

Funkhouser, "Ring: A Client–Server System for Multi–User Virtual Environments" Proceedings of the Symposium on Interactive 3D Graphics, Monterey, Apr. 9–12, 1995, pp. 85–92, XP000546194.

Benford et al, "Visualising and Populating the Web:Collaborative Virtual Environments for Browsing, Searching and Inhabiting Webspace" JENC 8, 8$^{th}$ Joint European Networking Conference, Edinburgh, UK, May 12–15, 1997, vol. I 29, No. 15, pp. 1751–1761, XP004099477.

Macedonia, et al, "NPSNET:A Network Software Architecture for Large Scale Virtual Environments", Presence, vol. 3, No. 4 (Fall 1994).

Greenhalgh et al, "Massive:A Virtual Reality System for Teleconferencing", ACM Transactions on Computer–Human Interfaces, 1995.

Macedonia, "A Network Software Architecture for Large Scale Virtual Environments", PhD Thesis, Naval Postgraduate Scholl, Monterey, California, 1995.

Bartle, "Interactive Multi–User Computer Games", ftp://ftp.parc.xerox.com/MOO/papers/mudreport.txt, (Dec. 1990).

Honda et al, "Technical Issues in the Design of a Scalable Shared Virtual World", Sony Computer Science Lab, Tokyo, Japan.

Morningstarr, et al, "The Lessons of Lucasfilm's Habitat", Cyberspace:First Steps, 1990, MIT Press, Cambridge, Mass.

Benford, et al, "A Spatial Model of Interaction in Large Scale Virtual Environments", proc. 3$^{rd}$ European Conference on CSCW (ECSCW'93), Milano, Italy, 1993, Kluwer.

Barrus et al, "Efficient and Precise Support for Large Scale Multi–Use Virtual Environments", IEEE Virtual Reality Annual Int. Symp (VRAIS), Mar. 1996.

Macedonia et al, "NPSNET:A Network Softare Architecture for Large Scale Virtual Environments" Presence, vol. 3, No. 4, Fall 1994.

Roehl, "The Technology Behind Distributed VR Systems", University of Waterloo, Toronto, 1996?.

Morse, "Interest Management in Large–Scale Distributed Simulations", Department of Information & Company Science, University of California, Irvine, 1996?.

Barrus et al, "Locales and Beacons"Efficient and Precise Support for Large Multi–User Virtual Environments, Mitsubishi Electric Research Laboratories, 1995.

Anderson et al, "Building Multi–User Interactive Multimedia Environments at MERL", Mitsubishi Electric Research Laboratories, 1995.

Brutzman et al, "Internetwork Infrastructure Requirements for Virtual Environments", Computer Science Department, Naval Postgraduate School, Monterey, California.

Macedonia, "A Network Software Architecture for Large–Scale Virtual Environments", PhD Thesis, Naval Postgraduate School, Monterey, California, Jun. 1995.

* cited by examiner

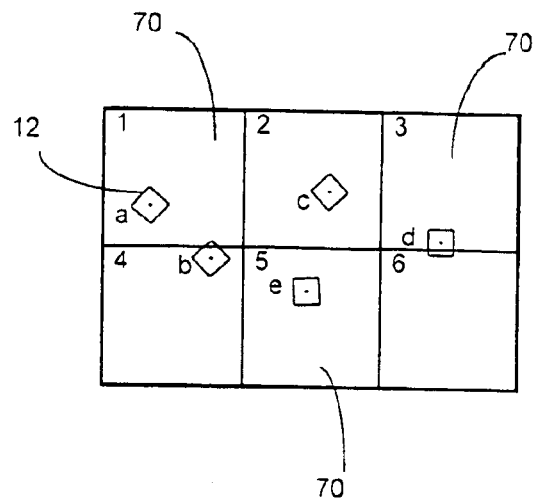
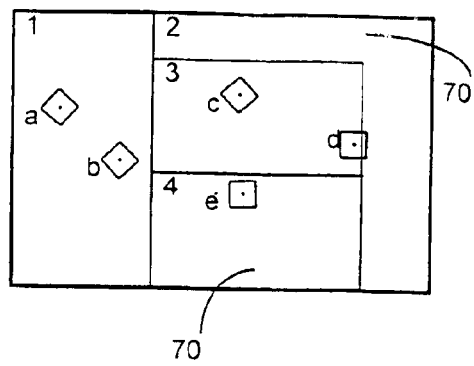
Fig 7A
Fig. 7B
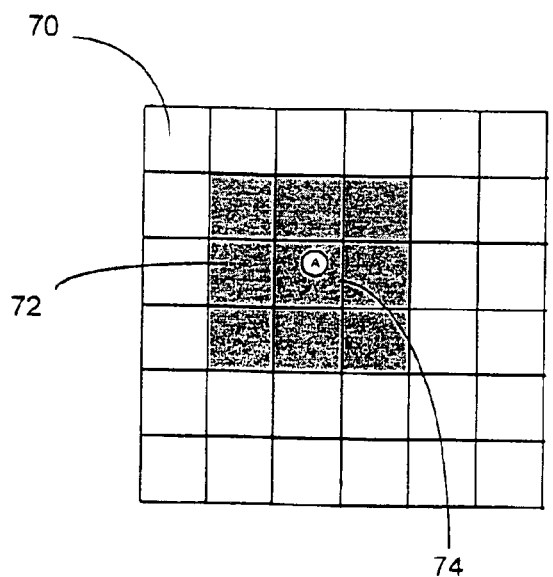
Fig. 8

DISTRIBUTED VIRTUAL ENVIRONMENT

RELATED APPLICATION

This application is related to copending commonly assigned application Ser. No. 09/743,898 filed Jan. 17, 2001.

BACKGROUND OF THE INVENTION

The present invention relates to a distributed virtual environment.

Computer and video gaming has been a popular pastime ever since the first personal computers and home video game consoles arrived back in the late 1970s. In the last two or three years the nature of these games has changed dramatically due to development in two technical areas.

Firstly increasing computer power has allowed complex 3-D virtual environments to be modelled and displayed. These environments allow players both to move through a virtual world and to interact with the entities within it.

Secondly the widespread growth in computer network usage and availability (e.g. corporate LANs and the internet) has led to many games boasting multi-player capabilities.

Taken together these two developments have resulted in the basis for many games becoming a shared Virtual Environment (VE) which allow groups of people to either compete (e.g. shoot at each other or hunt for treasure etc.) or co-operate (e.g. explore or solve puzzles, business problems etc.).

In delivering shared VEs a number of key issues as follow have to be addressed.

The usual present day implementation of a shared VE places a local copy of the common environment at each client. Players interact with the local copy and broadcast these interactions to other clients or servers. For example, a switch which opens a door may be modelled as an object at each client. It has state (the switch position) and behaviour (it animates when toggled and instructs another object, a door, to open). Both the state and behaviour are held on each client. When a user activates the switch the switch not only runs the relevant behaviour locally but messages to all instances of the switch on other clients instructing them to run the same behaviour. Since changes to the environment take time to propagate across the network it is possible that two players may perform conflicting actions (e.g. both pick up the same object). Resolving this type of problem to ensure the environment seen by each player is essentially the same is known as maintaining 'consistency'.

The time taken for information to propagate between clients is known as 'latency' and is a key factor when trying to maintain a believable and consistent environment. High or variable latency can make it difficult to maintain a common shared view amongst all clients.

If the state of a VE persists when no players are present and players can leave and rejoin without resetting its state then it is said to be a 'persistent' environment. Persistent environments normally require a server (or servers) to store the state of the VE.

An ideally 'scaleable' VE is one in which the number of players within it can increase with no theoretical limit (i.e. no component of the system is a potential performance bottleneck).

The above issues of consistency, latency, persistence and scalableness apply generally to both gaming and non-gaming VEs. A number of additional issues as follow, namely balance, reuse, integrity and extensibility, are of particular importance to gaming environments.

Non-shared and non-persistent VEs can be carefully controlled to deliver a balanced game for the player (e.g. as a player's skill improves the challenges they face may increase in difficulty). By contrast a persistent environment may evolve over months with hundreds of players influencing its development. It is therefore very difficult for the designer to control what and whom the player encounters during his or her game session. It may be necessary to dynamically introduce objects with new behaviour or modify an object's existing behaviour to maintain a 'balanced' game that all users can enjoy.

Many games share common characteristics and objects (e.g. missiles that may be fired by a player, switches that operate doors and pressure pads that trigger certain behaviour in particular objects etc.). Additionally many successful games have sequels produced based on the original story line and technology. Hence the ability to 'reuse' or carry common components between particular implementations is highly valuable.

For persistent gaming environments to succeed players have to trust the system to ensure fair play such that the system may be said to have 'integrity'. Few players would wish to play a game if others could cheat without fear of detection.

To create a persistent environment to which a player will wish to keep returning it is important that the environment can be extended and enhanced. Having built a community of users, 'extensibility' offers a means to retain them.

Existing distributed VE based games have tended to bring with them the development legacy of single player games with networking included as an additional feature rather than as an integral part. Hence a typical game will work as discussed by providing both the graphics and game-play related behaviour at each client and then synchronising with other clients by broadcasting the player's input to all other clients. This approach lacks both scaleability (as the network load at each client grows with every additional client) and persistence (as the environment state is lost when the last client leaves).

More sophisticated implementations add a specialised (i.e. unique to that game title) single central server to provide the environment state and broadcast or arbitrate on changes to the environments. This can provide a persistent environment but the single centralised server precludes scaleability. This is due to the fact that as client numbers increase both the server network traffic load and processing load increase forcing even the most powerful server to become a bottleneck.

Both of these approaches tend to place not only the game engine at the client but also the graphics engine. Whilst this has the potential to provide an efficient implementation (each client is effectively custom built for each game title) it limits balancing of the game play over time to the fixed constraints of the release version of the game rules. Also by associating the game rules so closely with the client implementation it limits reuse of components.

Somewhat more sophisticated examples of VE architecture have become apparent from a number of academic and military approaches.

The main focus of research in the VE field for academic or military systems has been the ability to deliver scaleability through suitable network architectures.

Known approaches have included techniques as follow.

Multicast network addresses may be associated with defined areas within the virtual environment. Changes within that area are broadcast via this address and clients interested in that area listen to the address to receive updates. Network traffic to a particular client therefore grows relative to the number of entities in its avatar's local area rather than in the complete environment. Such an approach is described in a paper in Presence Vol 3 No. 4 1994 by Michael R Macadonia entitled "A Network Software Architecture for large Scale Virtual Environments".

Alternatively, multicast network addresses may be associated with individual entities within the environment, which the entities then use to transmit their state (position or orientation etc.). As users come within range of entities (range being defined as awareness either visual or aural) they begin listening to the relevant network address and hence receive the current entity state. Such an approach may be seen in a paper entitled "MASSIVE: a Virtual Reality system for Teleconferencing" by Christ Greenhalgh and Steve Benford, published in ACM Transaction on Computer Human Interfaces, 1995.

Both of these approaches can be enhanced with simple environment state servers to offer a degree of consistency and persistence. However, these known approaches fail to address the issues directly relevant to gaming namely balance, reuse and integrity.

BRIEF SUMMARY OF THE INVENTION

According to one aspect of the invention there is provided apparatus for providing a client/server based virtual environment wherein each entity in the virtual environment is represented as a plurality of associated models of the entity, each of said plurality of models relating to a particular aspect of the entity, the apparatus comprising: a server implemented rule model manager arranged to provide conceptual models of the entities in the virtual environment; at least one server implemented dynamic model manager, the or each dynamic model manager being arranged to provide a dynamic model of at least one of the entities in the virtual environment; at least one client, the or each client being arranged to provide a visual model of at least one of the entities in the virtual environment; and communication channels for transmitting messages between the rule model manager, said at least one dynamic model manager and said at least one client to ensure consistency.

Separation of the dynamic and conceptual models makes balancing and extending the game far easier. Because the complex dynamics are handled elsewhere, a game designer has a conceptual model to work with that is highly focused on the game play and the game content. Modifying and adding to this will not involve any changes to the dynamic or visual models. Hence, game designers can focus on the issues relevant to the game play, and not on the behaviour and state distribution needed to maintain a shared VE.

The dynamic/conceptual/visual separation also encourages component re-use. The dynamic modelling required in a VE is fairly consistent, irrespective of the type of game. For example, whether the player is exploring a medieval dungeon or a modern office block, objects still can be thrown, dropped and collided with.

Hence, not only is it easy to vary an existing game, it should be simple to deliver a completely new game by providing a new set of conceptual representatives.

The dynamic/conceptual/visual separation allows the use of different technical implementations for the management of the VE. For the intensive dynamic modelling, where modifications are infrequent and speed critical, a compiled language may be desirable (e.g. C++). For the flexible and frequently modified conceptual modelling, an interpreted language (e.g. Java) may be more suitable. By contrast, without this type of process division, either speed or flexibility would have to be sacrificed.

The embedding of many of the game rules into a conceptual model, stored at a server, helps to reduce the upstream traffic requirement from each client. Where a client action may make a large number of dynamic changes to an environment (e.g. opening a door which pushes a number of objects aside), the client sends only a single high level request to the rule model manager. This may then be mapped into a large number of dynamic state changes by both the rule model manager and the dynamic model manager(s).

The combination of both the conceptual models (e.g. the game rules) and the dynamic models ensures the integrity and consistency of the apparatus. Clients can only make changes to the VE after they have been authenticated through either the conceptual models or the dynamic models. Hence players are assured of fair play for all. If the integrity of the environment is breached through users exploiting a code bug, fixes can be applied on the relevant server code. This avoids the need to trust users to install client patches as necessary.

According to another aspect of the invention, there is provided server apparatus for a client/server based virtual environment wherein each entity in the virtual environment is represented as a plurality of models of the entity, each of said plurality of models relating to a particular aspect of the entity, the server apparatus comprising: a server implemented rule model manager arranged to provide conceptual models of the entities in the virtual environment; at least one server implemented dynamic model manager, the or each dynamic model manager being arranged to provide a dynamic model of at least one of the entities in the virtual environment; and communication channels for transmitting messages between the rule model manager and said at least one dynamic model manager.

According to a further aspect of this invention, there is a provided client apparatus for a client/server based virtual environment wherein each entity in the virtual environment is represented as a plurality of associated models of the entity, each of said plurality of models relating to a particular aspect of the entity, the apparatus comprising: at least one client, the or each client being arranged to provide a visual model of at least one of the entities in the virtual environment: and communication channels for transmitting messages between said at least one client, a server implemented rule model manager arranged to provide conceptual models of the entities in the virtual environment, and at least one server implemented dynamic model manager, the or each dynamic model manager being arranged to provide a dynamic model of at least one of the entities in the virtual so environment.

According to a still further aspect of this invention, there is provided a method of providing a client/server based virtual environment wherein each entity in the virtual environment is represented as a plurality of associated models of the entity, each of said plurality of models relating to a particular aspect of the entity, the method comprising: providing a conceptual model of the entity, a dynamic model of the entity and a visual model of the entity; storing the conceptual model of an entity on a server implemented rule model manager and the dynamic model of the entity on a server implemented dynamic model manager; storing the visual model of the entity in a visual model on at least one client; and transmitting messages between the rule model manager, the dynamic model manager and said at least one client.

BRIEF DESCRIPTION OF THE DRAWINGS

Specific embodiments of the present invention will now be described by way of example and with reference to the accompanying drawings in which:

FIGS. 7A and 7B illustrate two examples of the subdivision of the virtual environment into zones;

FIG. 8 illustrates an area of interest for a given zone;

FIGS. 14a–4d illustrate an example of the zone manager to client approach.

DETAILED DESCRIPTION OF EXEMPLARY EMBODIMENTS

As discussed above, the use of a so called client/server architecture is well known in the field of virtual environments (VEs). The use of object-orientated (OO) techniques in modelling virtual environments (VEs) is also well known.

Figure 1:
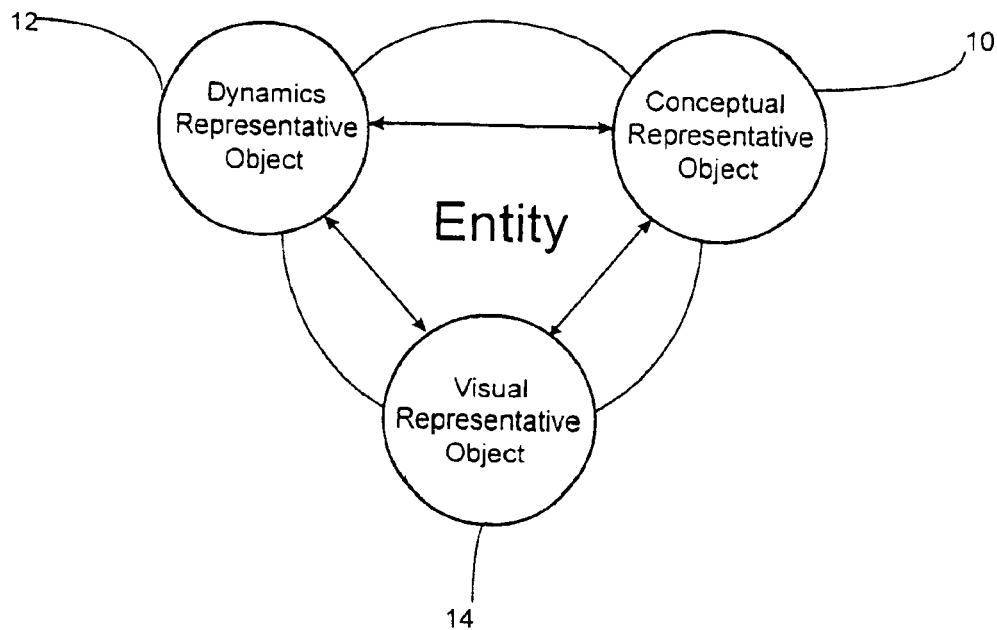
FIG. 1 represents a VE entity.

Having regard to FIG. 1 it will be seen that entities in a Virtual Environment (VE) are represented as three distinct yet associated objects 10, 12, 14 each providing a model of a different aspect of the entity. In this way each of the object is representative, in a given manner, of the complete entity.

The Conceptual Representative Object 10 describes an entity in the VE with respect to its game-play specific characteristics. The desired interaction between instances of different objects yields the rules and goals of the game.

By way of example, a gun in a game might be represented conceptually as a Gun Concept Object with the behaviour and state unique to a gun. A typical state might include "number of bullets left" and behaviours might include "pulling the trigger fires a bullet". However, the concept of the gun would not contain a visual model of the gun (e.g. list polygon or texture maps etc.) or a model of the gun dynamics (e.g. position, orientation, velocity or volume etc.).

The Dynamic Representative Object 12 describes the physical characteristics of an entity in the VE e.g. movement, spin, collision etc. A typical state held by the Dynamic Representative Object 12 might be the entity position, orientation, weight, collision volume or velocity etc. Typical behaviour associated with the Dynamic Representative Object might be how the entity moves when thrown, dropped or it collides etc. Conceptually different entities (e.g. a gun and a pen) may be associated with the same type of Dynamic Representative Object 12 but have different initial state parameters (e.g. whilst a gun and a pen are conceptually different they will both behave in similar fashion when thrown or dropped).

The Visual Representative Object 14 provides the user representation of the entity. It contains the state information and behaviour required to render the entity at a client. Typical state information held by the Visual Representative Object 14 might be the geometric description of the shape or the texture maps, sounds used etc. There is a close correlation between the types of visual objects and the types of dynamic objects as dynamic behaviour (e.g. a door opening) will have to be represented visually. However, where the dynamic model 12 of, for example a door, will ensure the door collides correctly with other entities as it opens, the visual model 14 will ensure it is rendered correctly as it rotates about its hinge.

A Visual Representative Object 14 may provide the user interface to an entity by indicating a set of actions an entity can be asked to perform (e.g. "open" for a door or "pull" for a lever etc.). These actions are determined by the Dynamic and Conceptual Representative Objects 12, 10 respectively and requests from a user to perform an action map directly to a request to either of these two Representative Objects. For example, a gun in the VE could be moved (a request to the Dynamic Representative Object 12) or fired (a request to the Conceptual Representative Object 101.

It is to be noted that whilst a single entity type is represented by a combination of three different objects 10, 12, 14, there will not necessarily be three unique types of object for each entity. Whilst two entities may be conceptually different they might both be modelled by the same type of Dynamic Representative Object 12 and rendered by the same type of Visual Representative Object 14.

For example a sword may be represented by the triplet "Sword Concept, Generic Entity Dynamic, Generic Entity Visual". Similarly a gun could be modelled using "Gun Concept, Generic Entity Dynamic, Generic Entity Visual". This principle extends to entities requiring more complex dynamic management yet no more sophisticated visual rendering. For example, a swinging door may be represented by the triplet "Door Concept, Swinging Door Dynamic, Animated Entity Visual" whereas a sliding door is represented by "Door Concept, Sliding Door Dynamic, Animated Entity Visual".

It is to be further noted that this entity triplet 10, 12, 14 defines an entity type but does not describe the number of Representative Objects created to model the entity. For each entity existing in the VE a single Conceptual Representative Object 10 and a single Dynamic Representative Object 12 is created. However it will be clear that a Visual Representative Object 14 must be instanced or created for each client that may visualise the entity. Hence an entity type is defined by the triplet "Conceptual Type, Dynamic Type, Visual Type". An instance of an entity may be defined by the group "Conceptual Instance, Dynamic Instance, Visual Instance, Visual Instance, . . . ".

Figure 2:
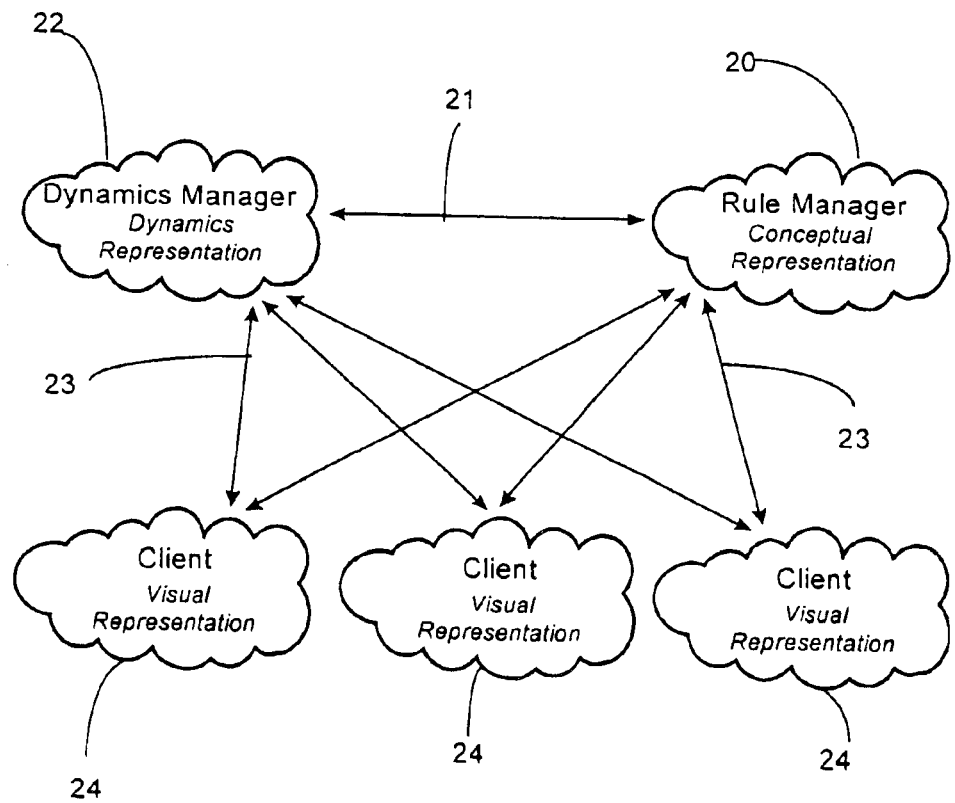
FIG. 2 represent a first network architecture according to the invention.

FIG. 2 illustrates one embodiment of a client/server network architecture to create a VE including entities represented as discussed with respect to FIG. 1.

The client/server network includes a server implemented Rule manager 20 and a server implemented Dynamics Manager 22. The Rule Manager 20 manages and stores Conceptual Representative Objects 10 and the Dynamics Manager manages and stores Dynamic representative Objects 12. Communication channels or connections 21 are provided between the Rule Manager 20 and the Dynamics manager 22. The communications channels transmit messages in the form of signals between the Rule manager 20 and the Dynamics manager 22.

The client/server network also includes clients 24, each of which manages and stores Visual representative Objects 14. Communication channels 23 are provided to transmit messages in the form of signals between the clients 24, the Rule Manager 20 and the Dynamics Manager 22.

Clients 24 therefore communicate dynamic change requests (e.g. the movement of a user represented by a so-called avatar)) to the Dynamics Manager (DM) 22 and higher level game-related requests (i.e. open door x) to the Rule Manager (RM) 20. The DM 22 validates changes to the environment, updates the environment state and broadcasts the changes to the clients 24. The RM 20 responds to requests by changing the game state and possibly placing requests with the DM 22 (e.g. add velocity x to entity y) via the network connection 21.

The respective client/server elements might utilise hardware/software as is indicated below.

The Rule Manager 20 runs on a server provided by a multi processor UNIX workstation or computer. The workstation runs a Java virtual machine in a UNIX operating system. (Java implementations are available from Sun Microsystems). Java is suitable to implement the RM 20 insofar as it is one of the most clean and simple OO programming languages and its ability to link/interpret new objects during run-time provides maximum flexibility when altering the game rules. UNIX machines offer high performance multi-threaded Java code and with a single RM controlling each VE the ability to increase performance by using multiple processors is useful.

The Dynamics Manager 22 runs on a server provided by a multi-processor UNIX workstation or computer. Since managing the dynamics of the VE is highly computationally intensive a powerful multiprocessor system is required, ideally with a very high floating point performance to handle the collision calculations. Since modifications will be infrequent but speed critical, a compiled language such as C++ is desirable.

The respective clients 24 may be implemented on any computer which is capable of providing a consumer level games platform and which supports three dimensional graphics and networking.

Each of the workstations or computers mentioned above is of conventional construction and includes input and output ports for connection to communications channels, a keyboard, a central processing unit and a store in the form of hard disk, random-access-memory (RAM) and read-only-memory (ROM). In each computer the operating system and application programs are loaded into the store. In each computer which functions as a server, the application programs include a program which provides the server functionality. Likewise, in each computer which functions as a client, the application programs include a program which provides the client functionality. The Rule Manager 20 and the Dynamics Manager 22 are implemented as software processes running on respective servers. Each one of the Conceptual Representative Objects, the Dynamic Representative Objects 12 and the Visual Representative Objects 14 is a software module held in the store of a respective one of the computers.

The servers which provide the Rule Manager 20 and the Dynamics manager 22 communicate with each other over a high bandwidth/low latency channel 21, for example FDDI or ATM, using a TCP/IP protocol stack. The client connections 23, whilst potentially low bandwidth, should offer consistent latency and bandwidth. Running IP (Internet Protocol) over a dial-in system over the PSTN (Public Switched Telecommunications Network) using PPP (Point-to-Point Protocol) should, for example, be suitable. The architecture is also highly suited to an asynchronous client network 23 such as those provided by ADSL (Asymmetric Digital Subscriber Line) technology where the downstream capacity is higher than the upstream capacity.

Figure 3:
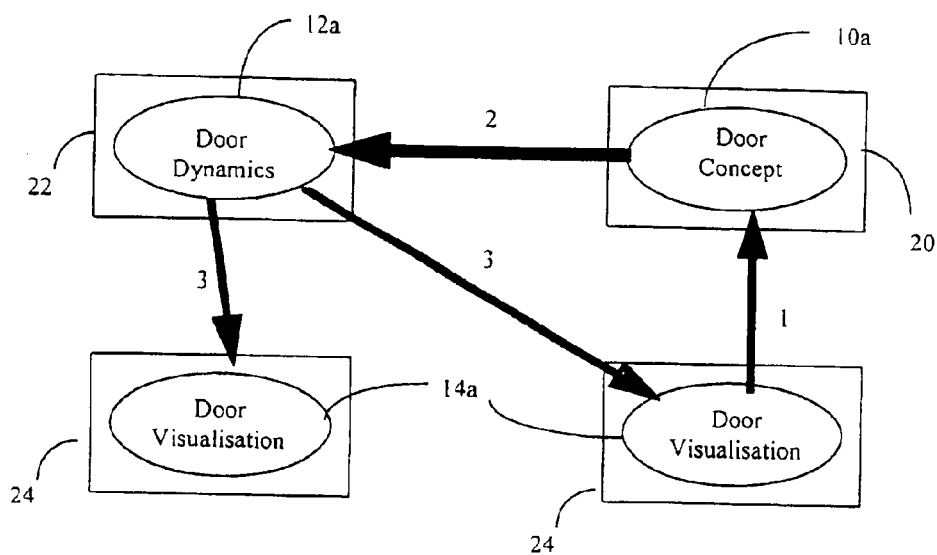
FIG. 3 illustrates messaging interaction between elements of the architecture of FIG. 1.

FIG. 3 shows an example of messaging interaction between respective clients and a Rule Manager 20 and a Dynamics Manager 22.

It will be assumed that the implemented embodiment uses a unique identifier to represent each entity within the system and that in particular a given door entity type may be represented as 'Door Concept, Sliding Door Dynamic, Sliding Door Visual'. The implemented embodiment further provides for sequenced, reliable message transfer between representatives objects of the same entity with an example message format of the form '<destination entity>, <request>, <. . . optional data . . . >'. A particular set of actions that the user can perform on each Visual Representative Object 14 will be defined.

In the example of FIG. 3, the Rule Manager 20 will have an instance of a Door Concept object 10a, the Dynamics Manager 22 will have an instance of a Sliding Door Dynamic object 12a and the clients 24 will have instances of the respective Sliding Door Visual object 14a. Each will be assigned the same identity door id.

Referring to the illustrative steps in FIG. 3.

(i) Through a Graphical User Interface (GUI), a user of a first client 24 selects the action 'open' from a list of actions permitted in respect of the Sliding Door Visual object 14a shown at the client.

The Sliding Door Visual object 14a constructs a message '<door id>, <client action>, <open, from user X>' which is sent to the RM 20. The RM delivers the incoming message (1) to its instance of the door entity, the Door Concept object 10a, using the unique identifier that heads the message. The Door Concept object 10a processes the request and, using internal game logic, decides if user X can, in fact, open the door.

(ii) Assuming that user X can open the door, the Door Concept object 10a constructs the message '<door id>, <open>' and sends it (2) to the DM 22.

The DM delivers the incoming message (2) to its version of the door entity, the Sliding Door Dynamic object 12a, using the unique identifier that heads the message. The Sliding Door Dynamic object 12a constructs a message for the Visual Representative Objects 14a of the form '<door id>, <open>, <to position . . . , over time . . . >'.

(iii) This message (3) is sent to all clients 24 having an instance of the relevant Visual Representative Object 14a. The Dynamic Representative Object 12a will, during a predefined time period, open the door whilst checking for collisions with other Dynamic Representative Objects. Each client 24 receiving the message (3) from the DM 22 will route it to its instance of the entity, the Sliding Door Visual object 14a.

The object 14a utilises the position and time data indicated in the message to animate the door opening with the appropriate visual effects.

Should the Dynamic Representative Object 12a detect a variation from the predicted situation, perhaps caused by collision or the destruction of the door, it will generate a new message for the clients 24 to update their Visual Representative Objects 14a of the form '<door id>, <stop opening>, <at position . . . >'.

It is to be noted that to provide an efficient implementation, the message format should be highly optimised rather than the ASCII strings indicated above. By way of example, if each of the concept/dynamic/visual representative objects has a defined, numbered set of requests, the message header becomes a pair of numbers. The first number, the entity id, allows incoming messages to be routed to the correct representative objective. The second number, the request, allows the relevant method on the representative object to be called. This can then unpack any additional data supplied in the message and implement the required request on a single server is unlikely to achieve the desired level of scalability. The vast majority of network traffic generated in a VE is related to the dynamics of the environment. Hence a single server could quickly form a communications bottleneck. Instead the dynamics management of the VE could be implemented to provide scaleability in both the processing load and the downstream network traffic to each client. Consequently the dynamics management is advantageously spread between multiple DMs and hence multiple servers.

Figure 4:
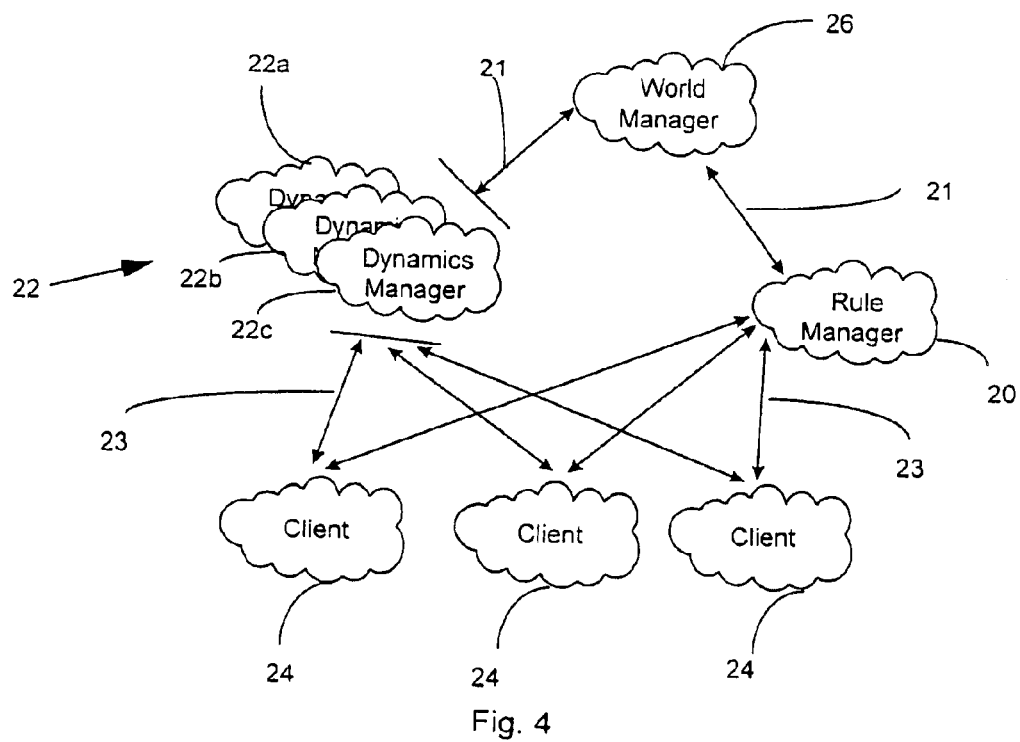
FIG. 4 represents a second network architecture.

FIG. 4 shows a preferred second embodiment of the invention based on this approach.

At the server end a Rule Manager (RM) 20 is provided as per the embodiment of FIG. 1. Several Dynamic Managers (OMs) 22a, 22b, 22c are provided along with a so called World Manager (WM) 26. Whilst the modelling of the dynamics of the environment is distributed, this is invisible to the conceptual model of the environment. The World Manager 26 provides a routing layer which allows the Rule Manager 20 to send messages directly to the Dynamic Manager 22 without having to track the location of the dynamic representative objects in the VE.

Appropriate communication between RM, WM and DMs is provided by means of respective network connections 21 between the RM 20 and WM 26, and between the WM 26 and each DM 22.

A further network connection 23 allows communication with one or more clients 24, each of which stores a Visual Representative Object.

Whilst multiple DMs 22a, 22b, 22c are required, the RM 20 should still be run as a single process. This is desirable as conceptual models may well have complex coupling between objects, which is independent of their position in the VE. For example, a puzzle in a game may involve the use of a series of levers, buttons and pressure pads distributed throughout the environment. By contrast dynamic interactions are limited to the area of a VE in which they occur.

It is possible to run the Conceptual Manager on a single server as the load and traffic will be far lower than that associated with dynamic interactions. By way of example a moving avatar might be generating 20 position update messages a second whereas actions performed by a user (flick switch or open a door etc.) will be relatively infrequent and non-repeating in nature.

The function of the WM 26, given the requirement for a distributed environment to run the dynamics model of the VE and a non-distributed environment for the conceptual model of the VE, is to provide a routing layer between the DMs 22 and the RM 20.

The RM 20 has a Conceptual Representative Object 10 for each entity in the VE. Each Conceptual Representative Object represents the conceptual identity of an entity (i.e. a gun or a door etc.) but has no knowledge of the location of the entity in the VE. Neither does it know where the matching Dynamic Representative Object 12 is in the distributed dynamic model. In this way the RM 20 is not loaded with traffic as entities move within the VE.

The WM 26 knows at a relatively coarse level where the Dynamic Representative Objects 12 are currently stored or instanced in the distributed dynamic model although it does not know their exact position in the VE. Each dynamic representative object provides the WM 26 with enough information on its location within the distributed dynamic environment to allow the WM to route messages from a Conceptual Representative Object 10 associated with the entity (stored at the RM 20) to its Dynamic Representative Object 12 (stored at the relevant DM 22). The format of this information is dependent on the implementation of the dynamic modelling system.

Each DM stores a Dynamic Representative Object 12 for each entity allocated to it in the VE. The relevant DM knows exactly where the entity is in the VE but does not know what concept that entity represents. A stored state represents the information required to generate a dynamic physical model of the environment.

Each client 24 stores a Visual Representative Object 14 for each entity within range (visual or aural) of the player's avatar. A stored state provides the information required to render each entity and the information required to make requests to the Conceptual or Dynamic. Representative Objects.

The respective client/server elements utilise hardware/software as was indicated above for the previous embodiment with the following additions. More than one multi processor UNIX workstation may be used to run the multiple Dynamics Managers. The World Manager 26 may be implemented on a typical UNIX workstation. Any suitable fast and efficient UNIX implementation will suffice to provide for the routing of messages.

Figure 5:
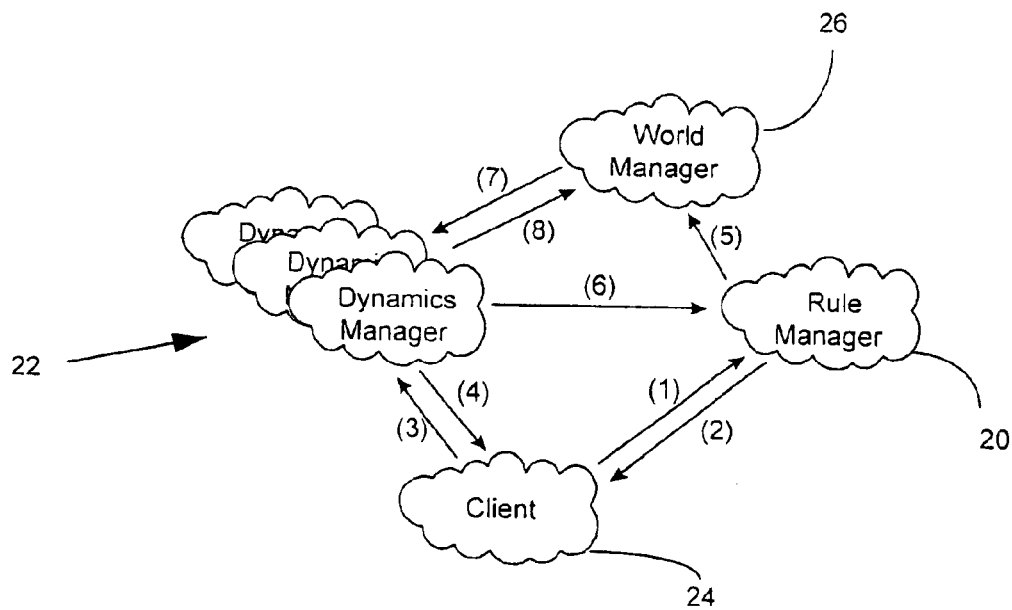
FIG. 5 represents communication channels between VE managers.

FIG. 5 indicates respective communication channels between managers 20, 22, 24, 26.

Typically the inter-manager communication channels indicated in FIG. 5 may be used as follows:

(1) Visual Representative Objects 14 sending requests from the player at a client 24 to its equivalent conceptual objects 10 (e.g. "open" for a door or "pull" for a lever).

(2) Conceptual Representative Objects 10 sending feedback to the player on the results of requests (e.g. "door is locked" for a "open" request).

(3) Visual Representative Object 14 sending requests to the Dynamic Representative Objects 12 (e.g. "entity move to x, y, y request").

(4) Dynamic Representative Objects 12 updating the Visual Representative Objects 14 on information required for rendering the scene (e.g. "entity position now x, y, z" or "door hinge at angle x").

(5) Conceptual Representative Objects 10 sending requests to their Dynamic Representative Objects 12 relying on the WM 26 to find their respective Dynamic representative Objects (e.g. "twist door open to angle x").

(6) Dynamic Representative Objects 12 informing Conceptual Representative Objects 10 of significant dynamic events. What is considered significant is determined by the Conceptual Representative Object 10 and it selects events by adding sensors to the Dynamic Representative Object (e.g. Glass Sheet Concept object adds collision sensor to its dynamic equivalent Generic Item Dynamic Object. Hence when an entity is struck, the corresponding Conceptual Representative Object is informed (6) and can handle the consequences accordingly).

(7) WM routing requests from the Conceptual Representative Objects 10 (5) to their respective Dynamic Representative Objects 12 (7) (e.g. "twist door open to angle x").

(8) Dynamic Representative Objects 12 registering a means of messaging to them. This channel is unnecessary in a simple non-scaleable architecture where a single DM is used.

All communications channels must be reliable. However, channels (3) and (4) may be supplemented with an unreliable data stream which may be useful for appropriate classes of message. A first circumstance might relate to messages that are frequently repeated and contain data that is time sequence independent. For example, position updates which, provided each update is part of a continuous sequence of updates, may be occasionally dropped without affecting the long term consistency of the VE. A second circumstance might relate to messages that are non-critical and make no permanent state change to the VE. For example, a message to instruct an avatar to wave a hand or to blink might be considered.

The dynamic model as outlined above is responsible for a number of tasks including the storing of the dynamic state of the environment (defined as the sum of the states of all the Dynamic Representative objects), providing clients 24 with initial information required to build the necessary Visual Representative Objects 14, updating the state of the Dynamic Representative Objects over time (e.g. the velocity of a Dynamic Representative Object may need a new value to be repeatedly calculated) and the distribution of required state updates to Visual and Conceptual Representative Objects (e.g. as a moving Dynamic Representative Object updates its position, the corresponding Visual Representative Objects will need to be informed of the new position to ensure accurate rendering of the scene).

The design of the dynamic model thus has to address at least three key areas. The first key area is consideration of delivery of the initial state. On connection, a client will need to be given a visual representation of the current dynamic state. With potentially thousands of entities, all possessing unique state (position, orientation, visual description etc.), this initial state download could be a lengthy process over a low bandwidth link (e.g. 28.8 kbits per second modem on PSTN). A preferred design should therefore attempt to minimise this initial download period.

The second key area is the consideration of the distribution of state updates. Clients need to ensure that they are visually representing an accurate description of the current dynamic state. However, with numerous Dynamic Representative Objects frequently updating state (moving, rotating and colliding etc.) this may generate a large amount of information exchange. A preferred design should also therefore attempt to minimise the amount of state update delivered to each client.

The third key area to address is consideration of the updating of states. Computing the necessary dynamic state updates can be computationally highly expensive and represents a potential limit on the number of entities represented in the dynamic model. Consequently a preferred design should attempt to distribute this load amongst multiple processors.

Figure 6:
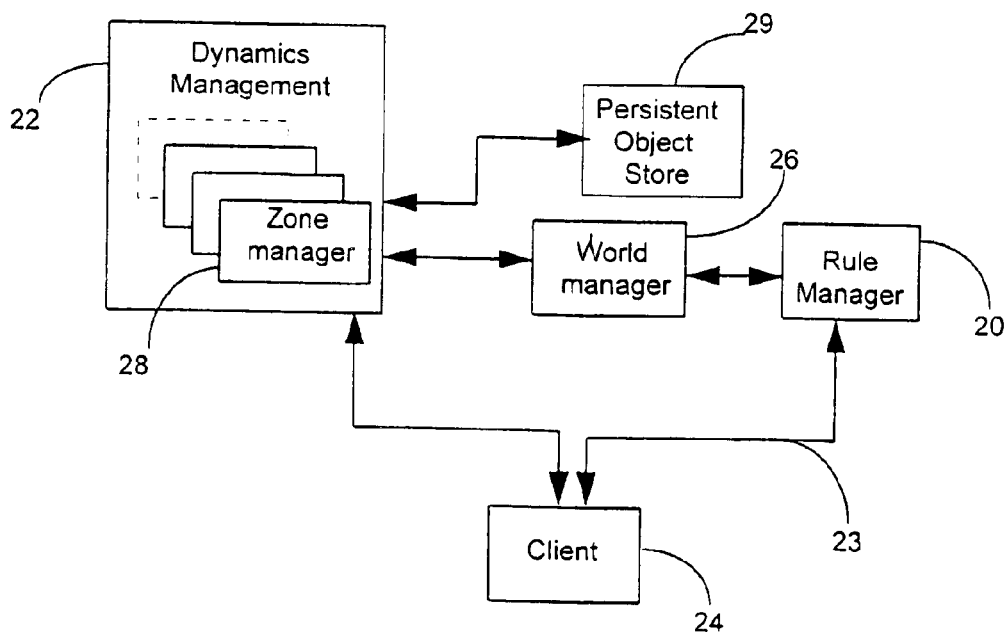
FIG. 6 represents a third embodiment of the invention.

A proposed architecture for addressing these issues is depicted in FIG. 6.

A Rule Manager 20 and at least one client 24 are present as with respect to earlier embodiments of the invention.

A World Manager 26 is likewise presented as discussed with reference to FIG. 4 but the one or more dynamics managers 22 are provided as one or more zone managers 28 associated with a persistent objects store 29.

As before the Rule Manager 20 will create and store and provide processing time for the various Conceptual Representative Objects 10 within the environment. Likewise the clients 24 will create and store and provide processing time to all the Visual Representative Objects 14 within the associated avatar area of interest.

The World Manager creates Zone Managers 28 as required, synchronises closure and start up of Zone Managers 28 and routes messages to the Dynamic Representative Objects 12 from the Conceptual Representative Objects 14 whilst providing load management.

Each Zone Manager 28 creates and stores and provides processing time to all Dynamic Representative Objects 12 within a particular allocated zone. Each Zone Manager is created by the World Manager 26 to manage zones with dynamic activity and will be closed down when dynamic activity in the assigned zone ceases. The persistent object store 29 provides storage facility for the Dynamic Representative Objects 12 within closed zones (i.e. zones with no zone manager allocated).

The Virtual Environment may thus be thought of as divided into a number of predefined volumes denoted as zones. Zones do not overlap but are laid out in such a way as to encompass the entire volume of the environment. Hence a selected point within the environment is always attributable to one and only one zone.

All Dynamic Representative Objects 12 have a single assigned zone at an instant in time. The actual zone in which a Dynamic Representative Object is placed is determined from its position in the VE. The state of the zone is defined as the sum of all the Dynamic Representative Objects 12 within the zone. The state of the environment is then defined as the sum of the states of all of its zones.

Zone shapes can either be regular and identical for all zones or may be based around the design of the environment itself. For example a simple sub-division of the environment might simply overlay a square grid over a horizontal plane and specify each zone as extending to infinity in the vertical direction. A more complex approach might sub-divide the virtual environment on the basis of its contents so the volume of a corridor would form one zone whilst the volume of an adjoining room would form another zone.

FIG. 7 illustrates two variations on sub-dividing a small environment (viewed from above).

FIG. 7A shows six zones 70 placing a Dynamic Representative Object 12 (a) in zone 1, (b) in zone 4, (c) in zone 2, (d) in zone 3 and (e) in zone 5. Note that whilst the volume of a Dynamic Representative Object 10 can overlap zone boundaries (e.g. (b) in FIG. 7A), the origin of the Dynamic representative Object can always be uniquely attributed to one zone (e.g. Zone 4 for (b) in FIG. 7A).

FIG. 7B shows the same environment with the Dynamic Representative Objects 10 in the same locations but with four zones to perform the sub-division. This places Dynamic Representative Objects (a) and (b) in zone 1 and (c) and (d) in Zone 3, and (e) in Zone 4.

It will be clear that the use of Zones 70 and Zone Managers 28 in this fashion offers possible solutions to the problems outlined above.

The problem of distributing the computational load for example will be resolved by maintaining and updating the dynamic state on a zone by zone basis. Each zone as indicated above will be associated with a process, termed the zone manage The zone manager will be responsible for generating time related state changes to the dynamic model (e.g. updating positions and velocities of objects), validating changes to the dynamic model (e.g. ensuring requests to move Dynamic Representative Objects from Visual or Conceptual Representative Objects are valid and do not cause Dynamic Representative Object volumes to overlap in a collision) and distributing changes to the dynamic model (e.g. updating relevant clients with new dynamic state after either of the above two events).

The division of computational load between numerous zone managers allows the environment size complexity to be scaled by increasing the number of processors available. Whilst neighbouring zones must be closely coupled so that boundary conditions are correctly handled (Dynamic Representative Objects moving across and placed close to zone boundaries), no coupling is needed between non-adjacent zones. Hence, whatever the environment size, the load on each zone manager is proportional to the dynamic modelling requirements of its localised area (i.e. the Dynamic Representative Objects in its allocated zone plus its immediate neighbours).

The use of zones also helps to reduce the amount of network traffic delivered to each client on initial connection and throughout the connection period. This is achieved by considering clients to have an area of interest centred around their avatar. Within this area of interest the clients will need both the initial state of all the Dynamic Representative Objects and the state updates to all Dynamic Representative Objects. Outside this area of interest neither initial state nor state updates will be required.

For example if an avatar is placed next to a bouncing ball the avatar's client will need to be told both the starting position of the ball and each new position if it is to correctly display the balls dynamic motion via a Visual Representation Object. In practice, a client may only be occasionally updated on the position of the ball and, between updates, predict the motion locally. If the bouncing ball is moved sufficiently far away from the avatar so that it is no longer in the client's visual range neither initial state nor state updates are now required. Since the player will remain unaware of the ball, the client can be as well.

In the zoned division of the environment, the client's area of interest 72 is defined as the area of the zone 70 in which its avatar is plus the area of all the immediately surrounding zones. FIG. 8 illustrates this for an environment utilising the simple zoning strategy of square zones extending to infinity in the vertical direction.

Each zone 70 has an associated state (the state of the Dynamic representative Objects within it) and an associated amount of network traffic (the message describing changes to the Dynamic Representative Objects). To maintain a complete model of the virtual environment at each client 24 would require that the state and associated network traffic of all zones be delivered to each client. However, through the use of avatar area of interest 72, the demands on each client can be constrained to the state and associated traffic of the zones local to its avatar. Hence the load placed on the network link 23 to the client becomes proportional to the activity in the environment 72 local to the client's avatar and not proportional to the environment's total size or complexity.

Figure 9:
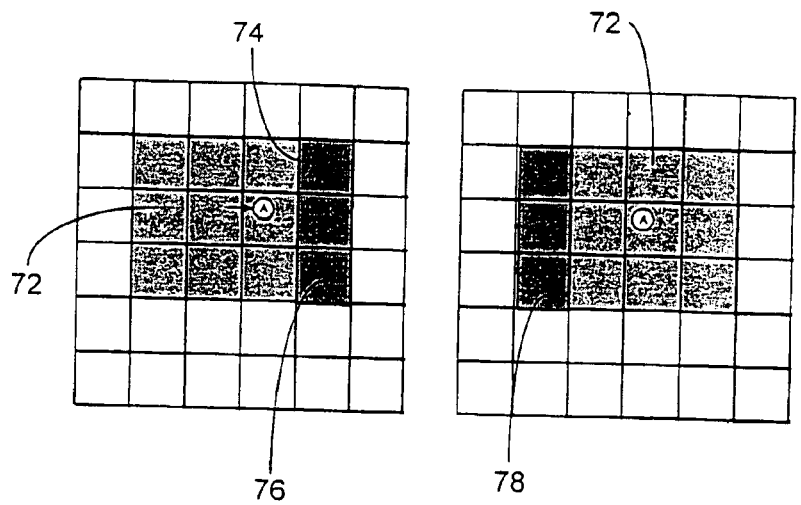
FIG. 9 illustrates the movement of an area of interest.

On creation of an avatar Dynamic Representative Object (for example as represented by A in FIG. 8), the initial state of the zones in the surrounding area of interest 72 can be delivered to the client associated with that avatar. The client is then termed to be "shadowing" these zones and, as their dynamic state changes, the associated zone manager informs the client. As the client's avatar A crosses a zone boundary 74 new zones 76 will come into its area of interest 72. The client then receives the initial state of the new zones and begins to shadow these zones as is illustrated in FIG. 9. As the avatar then moves away from the zone boundary it will stop shadowing the zones 78 now lying outside of its area of interest 72.

It is important that in the interest of efficient network utilisation this cessation of shadowing should not occur immediately a zone boundary 74 is crossed. By ceasing shadowing, the client becomes blind to any state changes within a zone 70 and hence on reconnection must fetch the complete state. An avatar oscillating over a zone boundary 74 with immediate halting of the shadowing would cause zone state descriptions to be repeatedly sent. In contrast if shadowing is not dropped immediately unnecessary fetching of initial states is avoided at the cost of an increased area of interest 72.

It is to be noted that this approach of zone shadowing is highly efficient in determining if the client needs the dynamic updates to a particular representative object. Each time a Dynamic Representative Object 12 needs to distribute a state change to its Visual Representative Objects 14, it sends messages to all clients 24 shadowing the zone in which it is currently located. These clients by virtue of their shadowing status will have an instance of the visual representative object 14 and hence will require the information.

On a client's 24 initial connection to the virtual environment the amount of state information downloaded is now reduced to the state of the zones in the area of interest 72 surrounding the player's avatar. The time this takes will be proportional to the number of Dynamic Representatives in the avatar's immediate locality. However, it will not be proportional to the actual size of the world or the total number of dynamic representatives.

Figure 10:
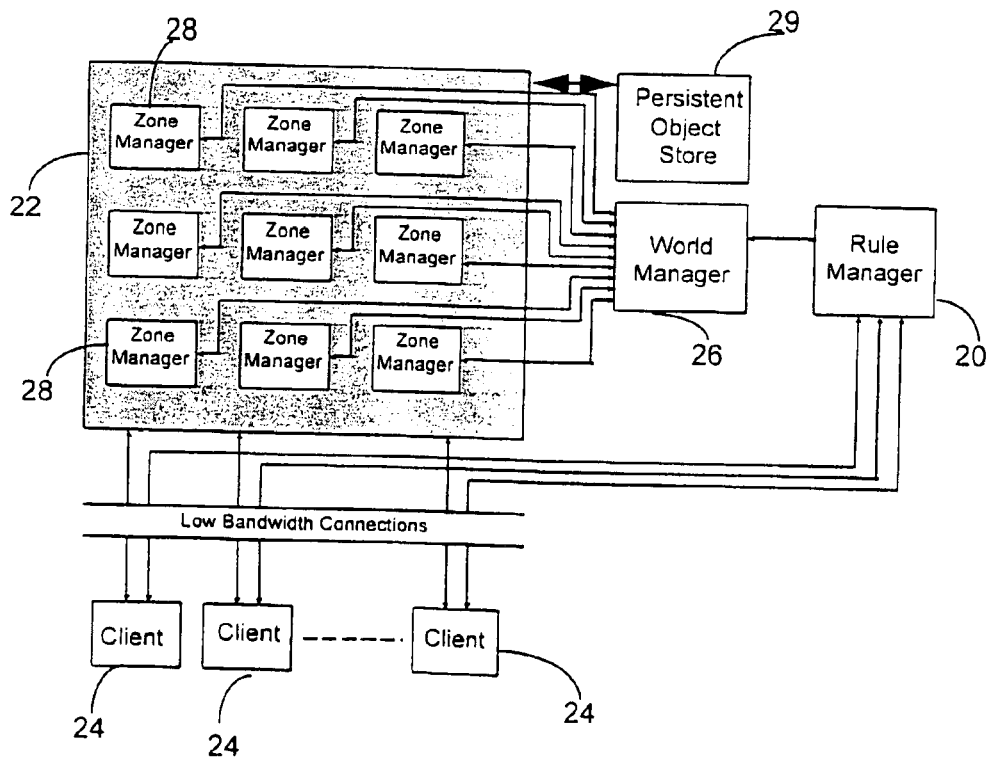
FIG. 10 illustrates the world manager to zone manager connections for the arrangement shown in FIG. 6.

Since the environment's Dynamic Representative Objects are now distributed amongst a number of Zone Managers 28 (as shown in FIG. 10), it is necessary to provide a means of routing messages from the Rule Manager 20 to the appropriate Zone Manager 28. Since the Rule Manager 20 is not aware of dynamic state changes, as the dynamic objects move through the environment and hence from zone to zone, the Rule Manager is unable to determine on which Zone Manager a particular Dynamic Representative Object currently resides.

The necessary routing is performed by the World Manager 26 which tracks the zone location of all Dynamic Representative Objects 12. As each Dynamic Representative Object moves into a new zone 70 either after creation or on crossing a zone boundary 74, the relevant Zone Manager 28 informs the World Manager of the identity of the current zone. This should not represent an excessive load on the World Manager 26 as the level of position tracking is very coarse (dependent on zone size).

After starting a zone 70, (a process that will be discussed in greater detail below), the World Manager 26 establishes a network connection 21 to the relevant Zone Manager as is illustrated in FIG. 10. On receiving a message for a particular Dynamic Representative Object, the World Manager looks up the Dynamic Representative Object's current location and delivers the message to the appropriate Zone Manager 28. The Zone Manager then handles delivery to the appropriate Dynamic Representative Object 12.

It is to be noted that if a Dynamic Representative Object is leaving a zone 70 at the same time that the World Manager 26 attempts to deliver a message to it, the message may arrive at the Zone Manager after the representative object has switched zones. In this case the Zone Manager may return the message as "lost" and the World Manager handles the routing of the message on to the new location.

Figure 11:
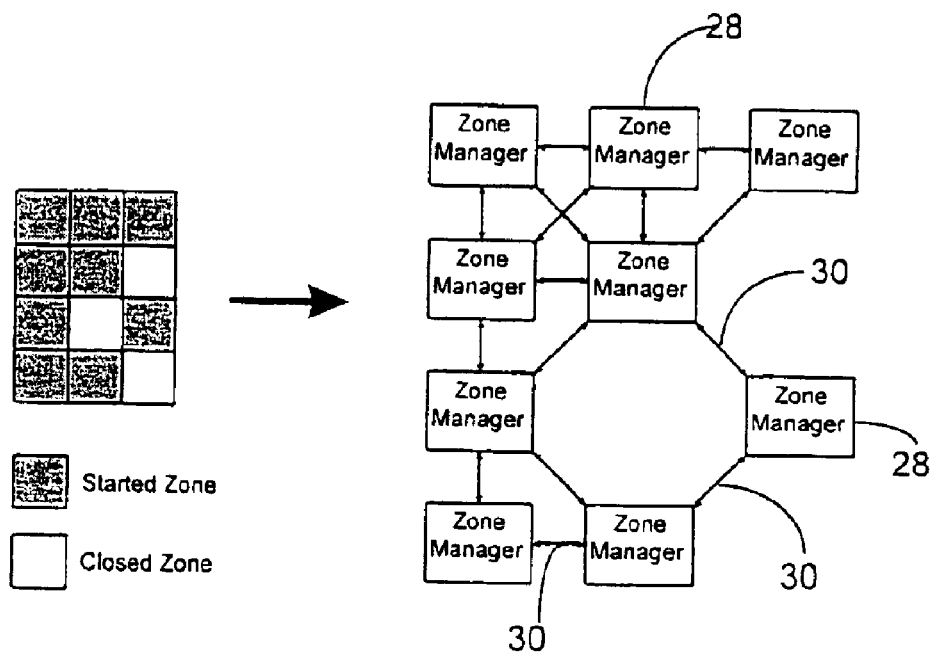
FIG. 11 shows an example of zone manager interconnections.

Each Zone Manager 28 is arranged to maintain a connection 30 to all its neighbouring Zone Managers as illustrated in FIG. 11. These connections between Zone Managers 28 enable Dynamic Representative Objects to be handled between Zone Managers as they cross zone boundaries. In the situation when a Dynamic Representative Object requests to move to a position outside of its Zone Manager's defined area of management, the request is delegated to the appropriate neighbouring Zone Manager. If the request can be completed (i.e. the requested location does not cause a collision), the state of the Dynamic Representative Object is sent to the new Zone Manager and the new version of it created and stored there. It is to be noted that in this situation it may be necessary for the original Zone Manager to request the World Manager to start the destination zone if it is not already running, a process again as will be discussed in greater detail below.

Figure 12:
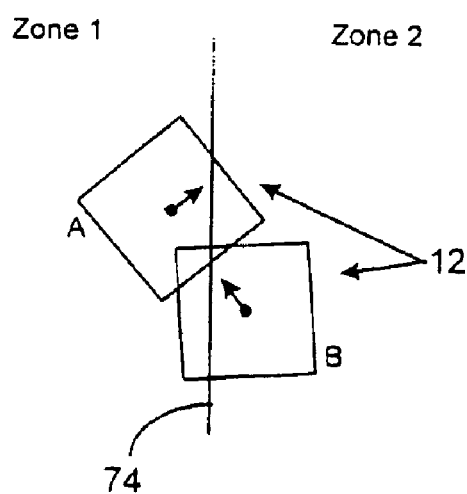
FIG. 12 illustrates collision between two dynamic representative objects at a zone boundary.

The zone interconnections 30 are also required to ensure the correct handling of collision detection and zone boundaries. FIG. 12 illustrates a problem that may arise when two Dynamic Representative Objects A and B are colliding whilst in adjoining zones and hence stored on different Zone Managers. If neither Zone Manager is aware of the other's dynamic state, this collision will not be detected. Each Zone Manager therefore "shadows" the dynamic state of all its neighbouring zones. This is achieved by each Zone Manager 28 storing shadow versions of all Dynamic Representative Objects in neighbouring zones. These shadow versions are available for collision detection but are not responsible for generating updates to their dynamic state. As a "master" Dynamic Representative Object (i.e. the one within the zone allocated to the Zone Manager which created it) changes dynamic state, it informs both its corresponding Visual Representative Objects and its shadow Dynamic Representative Objects. A Zone Manager is termed to be the master of its designated zone whilst shadowing the dynamic state of its neighbouring zones.

This master/shadow approach when applied to FIG. 12 would mean that the Zone Manager 28 of Zone 1 would be the master of A and the shadow of B and Zone Manager of Zone 2 would be the master of 8 and the shadow of A. As A (Master) updated a dynamic state it would use the inter-zone network connection 30 (as shown in FIG. 11) to inform its A (shadow) on the Zone Manager of the zone 2. Hence, 8 (Master) will detect the collision situation with A (shadow) and rebound appropriately. Likewise, A (Master) will be able to detect the collision with B thanks to its local instantiation of B (shadow).

It is unlikely to be feasible simultaneously to provide a Zone Manager 28 for every zone within the environment. An environment divided into a grid of 1000×1000 zones would require 1,000,000 Zone Managers if they were created on a manager per zone basis at system start-up. This would represent an unsupportable overhead on an operating system, even if the Zone Managers were distributed over numerous machines.

By default all zones 70 of the virtual environment are designated closed at system start-up, with no Zone Manager allocated, and the state of the initial dynamic representatives are placed in the persistent object store 29 (grouped by zone). The World Manager 26 scans this persistent store 29 at start-up to determine the location of all dynamic representatives. This allows it to perform the initial routing from conceptual to dynamic representatives.

Zones are started (i.e. allocated to a Zone Manager 28) when:

1) a conceptual representative object 10 needs to send a message to a dynamic representative object 12 in a closed zone (i.e. one which has no Zone Manager allocated); or
2) a conceptual representative object 10 needs to send a message to a particular zone 70, and the zone is currently closed. This may be necessary when a conceptual representative 10 needs to create its dynamic counterpart at a specific location in the environment; or
3) a dynamic representative object 12 on a neighbouring zone 70 wishes to move into a zone that is currently closed e.g. an avatar throws a ball across a zone boundary 74 from a started zone into a closed zone.

Cases 1 and 2 above can be detected by the World Manager 26 when performing routing for the Rule Manager 20. Case 2 is handled by simply checking if the requested zone is running (i.e. has been started), starting it if necessary, and then forwarding the message to it. Case 1 requires the World Manager 26 to look up the current zone of the requested dynamic object (as stored in the Persistent Object store 29), start that zone if it is not already running, and then forward the message on.

Case 3 is handled in a different way, and relies on allowing running Zone Managers to request one of their neighbouring zones be started. A Zone Manager, on detecting that a dynamic representative object needs to move into a currently closed zone, sends the request to the World Manager. The World Manager performs the creation process and the original Zone Manager will receive a connection from the new Zone Manager as it starts.

The start-up process for a Zone Manager 28 is as follows:

Establish network connection from World Manager 26 to a zone manager 28.

Receive allocated zone identity from World Manager, and extract current state of zone from the persistent object store 29.

Create all dynamic representative objects within allocated zone from extracted state description.

Receive identity of neighbouring zones, and, for those neighbours currently started, receive an address suitable to establish a network connection.

For all neighbouring zones not started, extract their current state from the persistent store and use this to create their shadow dynamic representatives.

For all neighbouring zones started, connect to them, receive their current state, and use this to create their shadow dynamic representative objects.

Connect to all relevant clients 24 (i.e. All those with avatars in the local area).

Inform World Manager 26 that zone start-up is complete.

On starting a Zone Manager, the World Manager 26 ensures that all the neighbouring Zone Managers are neither closing or starting. If adjacent zones are allowed to start or close together, unwanted situations develop with respect to forming inter-zone connections and accessing states from the persistent store 29.

The World Manager 26 can perform coarse load balance by distributing the creation of zone managers amongst the available servers. This distribution could be based on selecting the server with the lowest processing load in which to create new zone managers processes. Alternatively data such as the geographical relationship between zones could be factored in. e.g. zone managers handling adjacent zones may be held on the same server, in order to minimise their inter-zone communication delays.

Figure 13:
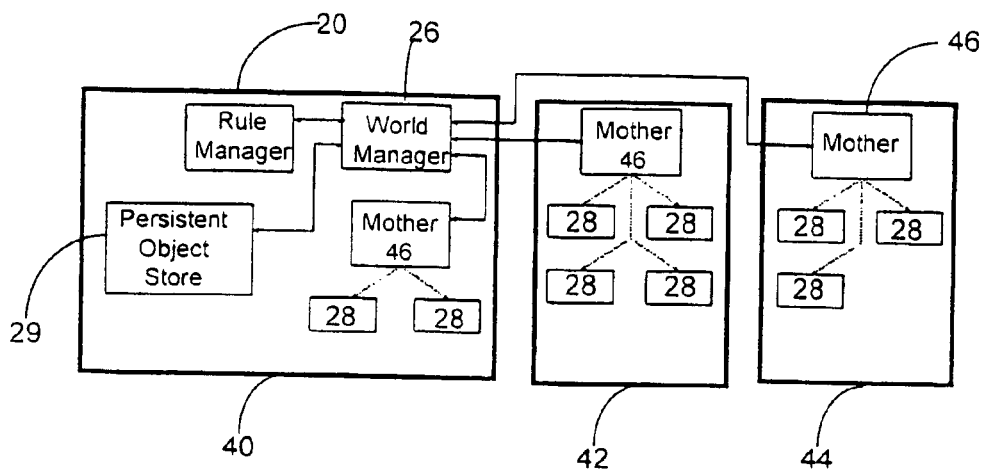
FIG. 13 illustrates a further embodiment of the invention.

An exemplary implementation of this load balancing is shown in FIG. 13. The Rule Manager 20, the World Manager 26 and the persistent object store 29 are held on a first server 40. Also held locally are two Zone Managers 28. A second server 42 holds four Zone Managers 28 and a third server 44 holds three Zone Managers 28. On each server, a mother processor 46 is held which is responsible for creating new Zone Manager processes (i.e. opening and closing) and reporting the average processor load on its particular server to the World Manager 26. On creation of a new zone manager 28 the world manager can query the available mothers to determine the least loaded one. It then delegates the responsibility of creating the zone manager to the appropriate mother, which generates it as a child.

If the creation of Zone Managers was allowed to continue indefinitely, the operating system overhead in maintaining large numbers of processes would become too great. It is therefore preferable to detect when it is possible to close a zone down and place its state back in the persistent store. The criteria for when a zone should be closed down will depend on factors such as:

the type of environment modelled;

the spare processing capacity of the processors supporting the Zone Managers; and the amount of time elapsed since activity last occurred in the zone.

If data has been accessed recently it is likely to be accessed again soon afterwards, and data close to it is also likely to be accessed. Similarly, if there is activity in one area of the VE there is likely to be both activity in the same area again soon and activity in adjacent areas.

The criteria for when a zone can close down is easier to define; a zone can close when it has become dynamically deterministic. This means that any client or manager with an interest in the dynamic description of the zone can predict the zone's future state from its current state, and hence the Zone Manager no longer has a role. In this situation the Zone Manager 28 can write its current state back into the persistent store and then terminate.

Conditions that prevent a zone being considered dynamically deterministic include: the presence of any dynamic representative object whose position and orientation are under the control of a client (an avatar for example). In this situation any changes the client will attempt to make to the dynamic state will need to be validated and possibly broadcast by the Zone Manager; and the presence of any dynamic representative object in non-constrained motion (e.g. a thrown item). In this case the future positions of the dynamic representative object depend on collision calculations, which are performed by the Zone Manager.

Note that the last condition does not preclude a zone from closing whilst it has dynamic representatives that are in motion. For example, if a dynamic representative continually oscillating between two fixed points is dynamically deterministic (constrained motion), the zone may close provided its visual representative or the clients can handle predicting its motion.

On determining that a zone both can and should close, the Zone Manager goes into the following sequence:

Obtains confirmation from the World Manager 26 that it can close down. This may be denied if any of the zone's neighbours are currently starting or closing.

Obtains confirmation from each of its neighbouring Zone Managers 28 that closing the inter-zone network link 30 is valid. This may be denied if a neighbouring Zone Manager has dynamic representative objects attempting to move into the zone attempting to close.

Writes the state of all the dynamic representative objects into the persistent object store 29 and terminates.

If any stage of the closed down sequence fails, the Zone Manager 28 unwraps the sequence, re-connecting closed network connections 30, fetching the dynamic state of any neighbours with which it lost contact and cancelling the closure operation with the World Manager.

Clients need to be supplied with enough information to create all the necessary visual representative objects within their avatar's area of interest 72. To do this network connections 23 must be formed between a client 24 and all the running Zone Managers 28 within its area of interest 72. Responsibility for forming these connections can be allocated to either the Zone Managers 28 or the Client 24 itself.

Zone Manager To Client Approach. This approach assumes the client's network address is available as part of the state of the each avatar's dynamic representative object. As a Zone Manager 28 creates an avatar (either the master or shadow version), it extracts the client address from the avatar and connects to the client. It can then deliver the necessary state information to allow the client to create all the necessary visual representative objects, and update this state as required. It is then the responsibility of the client to terminate the connection to this zone, normally performed when its avatar has moved to a non-adjacent zone.

An example of this approach to forming client connection is illustrated in FIGS. 14a–14d.

Figure 14A:
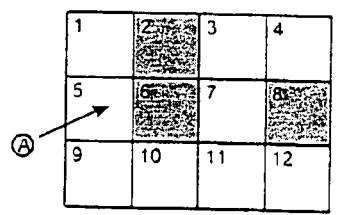
Figure 14B:
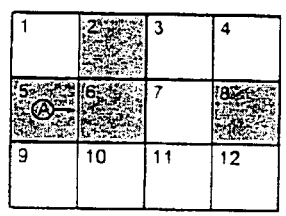

1) In FIG. 14a, Zones 2, 6 and 8 are running, the rest of the zones being closed. An avatar A is to be introduced into zone 5.

2) The message from a client 24 to create the avatar's dynamic representative object will cause the World Manager 26 to start a Zone Manager 28 for zone 5. This will create the master version of the avatar's dynamic representative object A (FIG. 14b), and tell neighbouring zones 2 and 6 to create a shadow version. All three Zone Managers (for zones 2, 6 and 5), on detecting the introduction of an avatar, will then connect out to the client 24 associated with the avatar, and supply their current state. The avatars area of interest 72 also includes zones 1, 9 and 10, and the client 24 therefore also requires the description of the current state of these zones. Since they have no designated Zone Managers to perform this function, the task is delegated to the Zone Manager creating the master version of the dynamic representative object. Hence in this case Zone Manager 5 will supply the current state of zones 1, 9 and 10 to the client. Note that this does not require Zone Manager 5 to access the state placed in the persistent object store, as it will already have fetched the current state description to perform zone shadowing.

Figure 14C:
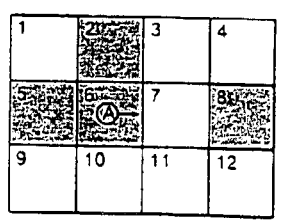

3) In FIG. 14c the player has moved the avatar A into zone 6. This causes Zone Managers 5 and 6 to swap master/shadow responsibility for the dynamic representative of avatar A. The avatar's area of interest now incorporates zones 3, 7 and 11. Since these are closed zones, on becoming the master of the dynamic representative Zone Manager 6 will supply their current state.

Figure 14D:
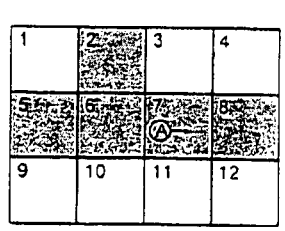

4) In FIG. 14d the player has moved the avatar A into zone 7. Since zone 7 was closed, on attempting to move the master dynamic object into zone 7, Zone Manager 6 requests the World Manager 26 to start zone 7. On creation of the master dynamic representative object on Zone Manager 7, a shadow version will also be created on Zone Manager 8. Both of these Zone Managers will then connect out to the client 24, using the network address embedded in the avatar. Zone Manager 8 will deliver its current state to the client and Zone Manager 7 will supply the state description of zones 4 and 12. It will not supply its own state description, as the client as already been provided with this from Zone Manager 6. When the client determines its avatar is sufficiently far from the zone 6/7 boundary, it will drop the connection to Zone 5 and delete any associated state.

Note that the above description presumes a non-optimised solution. Various improvements could be made to reduce the amount of information transmitted to the client, e.g. cache the zone state at the client and only provide updates if the client's cached state differs from the actual state. This would prevent repeated downloads of the state of zones that have remained closed, and hence unchanged. Improvements could also be made to optimise the movement of dynamic representative objects across zone boundaries, e.g. predict when an avatar is expected to enter a closed zone and place a request to start the appropriate zone with the World Manager 26 in advance.

The alternative to the above approach, where zone managers take responsibility for ensuring clients are connected to them, is to move the responsibility to the clients themselves. This requires that, when the avatar's conceptual representative object creates the dynamic representative object, it also informs the client of the address of the Zone Manager on which the dynamic representative object is stored. The client can then connect to this Zone Manager, and request that it supply: the state of all closed neighbouring zones, and the address of the Zone Manager(s) for all running neighbouring zones. The client can then form connections to all running Zone Managers in its area of interest 72. As the dynamic representative object moves between zones the process can be repeated, allowing the client to maintain connections to all Zone Managers within its area of interest.

The advantage of this approach is that clients are not limited to fixed areas of interest. Dependent on the bandwidth available, the activity within the environment and the type of environment, the client may wish to either expand or contract its area of interest by varying the number of Zone Manager connections. By contrast the alternative approach, with Zone Managers forming the connections to clients, fixes the area of interest to the zone the avatar is currently in together with its neighbours. However, by placing connection responsibility at the Zone Manager, client queries of zone. started/closed state (with the associated delay and bandwidth usage this entails) are avoided. Connections to clients are made automatically when a Zone Manager detects the presence of an avatar.

One possible enhancement to the architecture suggested in FIG. 6 is to associate a multi-cast address with each Zone Manager 28, and hence each running zone. Each client, on forming a connection with a Zone Manager, would also connect to the associated multi-cast address. This would allow temporary visual effects to be communicated between clients without placing a load on the Zone Manager. For example, making an avatar wave its hand in greeting is a one off visual effect, making no permanent change to the VE state. The instruction to perform this action could therefore be distributed via the multi-cast address associated with the avatar's current zone. This would ensure all clients, whose area of interest encompassed the avatar's zone, received the instruction. The avatar's visual representative object on each client would then perform the hand wave visual effect.

The provision of a multi-cast address would also provide an unreliable distribution mechanism for the Zone Manager. The Zone Manager to Client connections 23 discussed earlier are all assumed to be reliable to ensure the client receives an accurate description of the initial state. However, state updates that are repeating in nature (e.g. position updates of a moving object) need not be delivered in a reliable manner. Provided the final update is delivered reliably and the visual representative object offers a degree of prediction and interpolation, missing an intermediate update should not present a problem.

Once running, a Zone Manager 28 has the following responsibilities:

Maintain a list of network connections that require updates to the dynamic state delivered to them. This list is used by the dynamic representative objects (created on the Zone Manager), to distribute any changes to their state. The list will consist of clients whose area of interest intersects the zone and the Zone Managers assigned to neighbouring zones.

Deliver messages originating from conceptual representative objects 10 in the Rule Manager 20 (routed via the World Manager 26), to the appropriate dynamic representative objects 12.

Deliver messages originating from visual representatives 14 to the appropriate dynamic representative objects 12 (e.g. updates to avatar position).

Provide shadowing of the dynamic state of all neighbouring zones.

Provide collision detection facilities to dynamic representative objects, allowing them to test the validity of new positions. p1 Provide processing time slices to any dynamic representative object that requests them. For example, a ball bouncing through the environment will need to regularly re-calculate its position and test new positions for collisions.

Synchronise hand-over of dynamic representative objects between Zone Managers, as the representatives cross zone boundaries.

Monitor zone state for valid conditions to close the zone down.

What is claimed is:

1. Apparatus for providing a virtual environment, said virtual environment arranged to include one or more entities, the or each entity being represented in the virtual environment by at least a conceptual entity-model, a dynamic entity-model and a visual entity-model, each of said entity models being mutually independent, said apparatus comprising:

server applications arranged to provide:
a conceptual-model manager, said conceptual-model manager arranged to provide conceptual entity-models;
one or more dynamic-model managers, the or each dynamic-model manager arranged to provide dynamic entity-models;

one or more client apparatuses, the or each client apparatus arranged to provide one or more visual-model managers, respectively, said one or more visual-model managers each arranged to provide visual entity-models; and a communications apparatus arranged to allow transmission of messages between said conceptual-model manager, said one or more dynamic-model managers and said one or more visual-model managers;

in which said virtual environment is divided into mutually exclusive zones with the or each entity, represented by respective entity-models, being located in one of said zones, and at least one dynamic-model manager is provided, wherein the or each dynamic-model manager comprises: one or more zone managers, each zone manager being arranged to provide dynamic entity-models in an associated zone.

2. Apparatus according to claim 1, in which the server apparatus is arranged to provide a plurality of dynamic-model managers, wherein said plurality of dynamic-model managers are distributed across a plurality of independent servers.

3. Apparatus as claimed in claim 2 in which, in use, said dynamic-model manager is executed from a compiled language whereas said concept-model manager is executed from an interpreted language.

4. Apparatus as claimed in claim 1, further comprising a virtual environment manager arranged to associate ones of said zone managers with ones of said zones in response to the behaviour of dynamic entity-models.

5. Apparatus as claimed in claim 4, wherein said virtual environment manager is further arranged to route messages from conceptual entity-models to the appropriate one of said zones in which a corresponding dynamic entity model is located.

6. Apparatus as claimed in claim 4, in which at least one of the client apparatuses is associated with an avatar entity, wherein said at least one client apparatus is arranged to receive messages from the zone managers associated with both the zone in which the avatar entity is located and the zones neighbouring the zone in which the avatar entity is located.

7. Apparatus as claimed in 6, wherein a multicast address is associated with each zone manager.

8. Server apparatus for providing a virtual environment, said virtual environment arranged to include one or more entities, the or each entity being represented in the virtual environment by at least a conceptual entity-model, a dynamic entity-model, a dynamic entity-model and visual entity-model, each of said entity models being mutually independent, said server apparatus comprising an apparatus arranged to provide:

a conceptual-model manager, said conceptual-model manager arranged to provide conceptual entity-models;

one or more dynamic-model managers, the or each dynamic-model manager arranged to provide dynamic entity-models, and a communications apparatus arranged to allow the sending of messages from said conceptual-model manager and said one or more dynamic-model managers and the receiving of messages from one or more visual-model managers provided by one or more client apparatuses, each visual-model manager being arranged to provide visual entity-models;

wherein said virtual environment is divided into mutually exclusive zones with the or each entity, represented by respective entity-models, being located in one of said zones, and at least one dynamic-model manager is provided, wherein the or each dynamic-model manager comprises: one or more zone managers, each zone manager being arranged to provide dynamic entity-models in an associated zone.

9. Client apparatus for providing a virtual environment, said virtual environment arranged to include one or more entities, the or each entity being represented in the virtual environment by at least a conceptual entity-model, a dynamic entity-model and a visual entity-model, each of said entity models being mutually independent, said client apparatus comprising:

an apparatus arranged to provide one or more visual-model managers, said one or more visual-model managers each arranged to provide visual entity-models; and a communications apparatus arranged to allow the sending of messages from said one or more visual-model managers and the reception of messages from a conceptual-model manager and one or more dynamic-model managers provided by a server apparatus, said conceptual-model manager being arranged to provide conceptual entity-models and the or each dynamic-model manager being arranged to provide dynamic entity-models;

wherein said virtual environment is divided into mutually exclusive zones with the or each entity, represented by respective entity-models, being located in one of said zones, and at least one dynamic-model manager is provided, wherein the or each dynamic-model manager comprises: one or more zone managers, each zone manager being arranged to provide dynamic entity-models in an associated zone.

10. A method for providing a virtual environment, said virtual environment arranged to include one or more entities, the or each entity being represented in the virtual environment by at least a conceptual entity-model, a dynamic entity-model and a visual entity-model, each of said entity models being mutually independent, said method comprising:

providing a conceptual-model manager, said conceptual-model manager arranged to provide conceptual entity-models;

providing one or more dynamic-model managers, the or each dynamic-model manager arranged to provide dynamic entity-models, providing, one or more visual-model managers, said visual-model managers each arranged to provide visual entity-models; and allowing transmission of messages, between said conceptual-model manager, said one or more dynamic-model managers and said one or more visual-model managers;

wherein said virtual environment is divided into mutually exclusive zones with the or each entity, represented by respective entity-models, being located in one of said zones, and at least one dynamic-model manager is provided, wherein the or each dynamic-model manager comprises: one or more zone managers, each zone manager being arranged to provide dynamic entity-models in an associated zone.

11. A computer program stored on a computer readable data carrier which, when loaded onto server apparatus, provides a server apparatus as claimed in claim 8.

12. A computer program stored on a computer readable data carrier which, when loaded onto client apparatus, provides a client apparatus as claimed in claim 9.

* * * * *